(12) United States Patent
Fukuda

(10) Patent No.: US 11,003,983 B2
(45) Date of Patent: *May 11, 2021

(54) TRAINING OF FRONT-END AND BACK-END NEURAL NETWORKS

(71) Applicant: INTERNATIONAL BUSINESS MACHINES CORPORATION, Armonk, NY (US)

(72) Inventor: Takashi Fukuda, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,201

(22) Filed: Oct. 31, 2019

(65) Prior Publication Data

US 2020/0065655 A1    Feb. 27, 2020

Related U.S. Application Data

(63) Continuation of application No. 15/240,613, filed on Aug. 18, 2016, now Pat. No. 10,657,437.

(51) Int. Cl.
*G06N 3/04* (2006.01)
*G06N 3/063* (2006.01)
(Continued)

(52) U.S. Cl.
CPC ........... *G06N 3/0454* (2013.01); *G06N 3/063* (2013.01); *G10L 15/20* (2013.01);
(Continued)

(58) Field of Classification Search
CPC .................................................... G06N 3/0454
See application file for complete search history.

(56) References Cited

U.S. PATENT DOCUMENTS 7,885,812 B2    2/2011    Acero et al.
8,554,555 B2   10/2013    Gruhn et al.
(Continued)

OTHER PUBLICATIONS

"Dropout: A Simple Way to Prevent Neural Networks from Overfitting," Nitish Srivastava, Geoffrey Hinton, Alex Krizhevsky, Ilya Sutskever, Ruslan Salakhutdinov, Journal of Machine Learning Research 15 (2014) 1929-1958 Submitted Nov. 2013; Published Jun. 2014) (Year: 2014) (Year: 2014).*

(Continued)

*Primary Examiner* — Hal Schnee
(74) *Attorney, Agent, or Firm* — Tutunjian & Bitetto, P.C.; Randall Bluestone

(57) ABSTRACT

A computer-implemented method for training a front-end neural network ("front-end NN") and a back-end neural network ("back-end NN") is provided. The method includes combining the back-end neural network with the front-end neural network to form a joint layer to thereby generate a combined neural network. The method also includes training the combined neural network for a speech recognition with a set of utterances as training data, with the joint layer having a plurality of frames and each frame having a plurality of bins, and where one or more specific units in each frame are dropped during the training, each of the specific units being selected randomly or based on a bin number to which the respective unit is set within its frame, with the specific units corresponding to one or more common frequency bands.

20 Claims, 10 Drawing Sheets

(51) Int. Cl.
*G10L 21/0232* (2013.01)
*G10L 15/20* (2006.01)
*G10L 21/0208* (2013.01)
*G06N 3/08* (2006.01)
*G10L 15/16* (2006.01)

(52) U.S. Cl.
CPC .......... *G10L 21/0208* (2013.01); *G06N 3/084* (2013.01); *G10L 15/16* (2013.01); *G10L 21/0232* (2013.01)

(56) References Cited

U.S. PATENT DOCUMENTS

| | | | |
|---|---|---|---|
| 9,240,184 B1* | 1/2016 | Lin | G10L 15/142 |
| 9,390,712 B2 | 7/2016 | Yu et al. | |
| 9,436,895 B1* | 9/2016 | Jones | G06N 3/0454 |
| 2015/0161522 A1 | 6/2015 | Saon et al. | |
| 2015/0161995 A1 | 6/2015 | Sainath et al. | |
| 2017/0068888 A1* | 3/2017 | Chung | G06N 3/084 |

OTHER PUBLICATIONS

"Speech Enhancement in Multiple-Noise Conditions using Deep Neural Networks," Anurag Kumar and Dinei Florencio, arXiv: 1605.02427v1 [cs.SD] May 9, 2016 (Year: 2016) (Year: 2016).*

"A Regression Approach to Speech Enhancement Based on Deep Neural Networks" (Yong Xu, Jun Du, Li-Rong Dai, and Chin-Hui Lee, IEEE/ACM Transactions on Audio, Speech, and Language Processing, vol. 23, No. 1, Jan. 2015) (Year: 2015) (Year: 2015).*

"Removal of Hidden Neurons by Crosswise Propagation," Xun Liang, Neural Information Processing—Letters and Reviews, vol. 6, No. 3, Mar. 2005, pp. 79-86 (Year: 2005) (Year: 2005).*

"A Simple Neural Network Pruning Algorithm with Application to Filter Synthesis," Kenji Suzuki, Isao Horiba and Noboru Sugie, Neural Processing Letters 13: 43-53, 2001, Kluwer Academic Publishers (Year: 2001) (Year: 2001).*

List of IBM Patents or Patent Applications Treated as Related dated Oct. 31, 2019, 2 pages.

Droppo J., et al., "Joint Discriminative Front End and Back End Training for Improved Speech Recognition Accuracy". Speech Technology Group Microsoft Research 2006 IEEE. ICASSP 2006. pp. I-281-I-284.

Narayanan A., et al., "Improving Robustness of Deep Neural Network Acoustic Models via Speech Separation and Joint Adaptive Training". IEE/ACM Transactions on Audio, Speech, and Language Processing, vol. 23, No. 1. Jan. 2015. pp. 92-101.

* cited by examiner

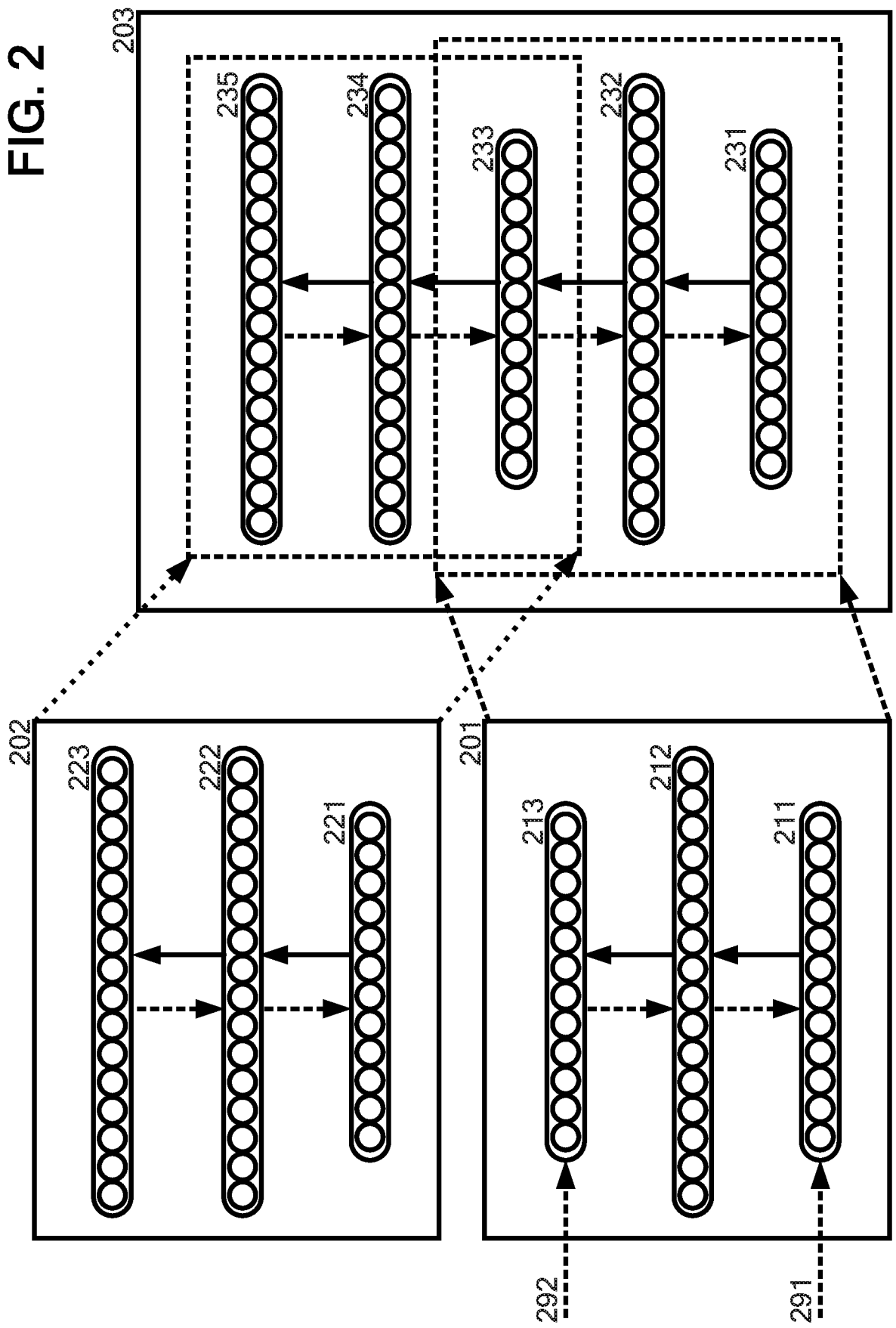

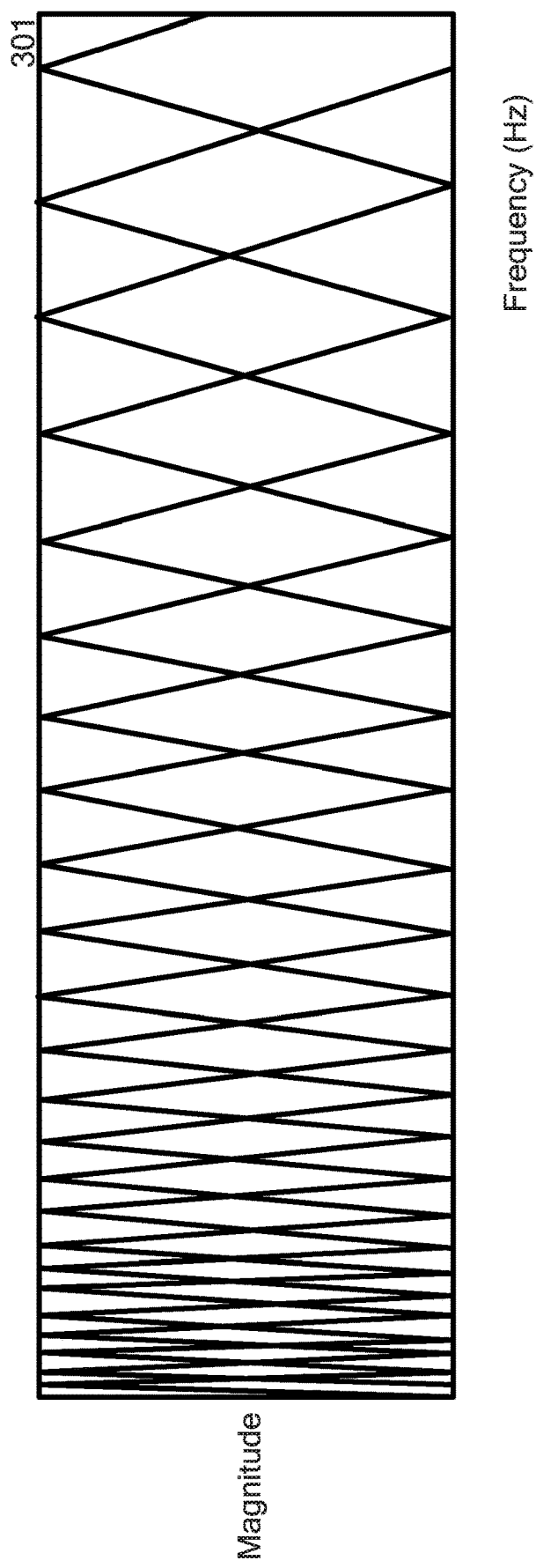

FIG. 8A

|   | Model system name | Denoiser (front-end NN) | AM (back-end NN) | WER% | | | | Overall AVG |
|---|---|---|---|---|---|---|---|---|
|   |   |   |   | WV1 (matched channel) | | WV2 (mismatched channel) | | |
|   |   |   |   | Clean | AVG of noisy condition | Clean | AVG of noisy condition | |
| A | Baseline CNN-AM (No denoiser) | N/A | CNN | 4.54 | 8.2 | 6.93 | 15.42 | 10.96 |
| B | Joint training of the combined NN | CNN | DNN | 4.07 | 7.24 | 7.23 | 16.46 | 10.96 |
| C | B with a radom dropping only at the joint layer | CNN | DNN | 3.94 | 7.08 | 7.12 | 15.84 | 10.62 |
| E | B with a dropping only for specific frequency bands at the joint layer | CNN | DNN | 4.02 | 6.95 | 6.63 | 15.69 | 10.46 |

AVG=average

FIG. 8B

| | Model system name | Denoiser (front-end NN) | AM (back-end NN) | WER% | | | | |
|---|---|---|---|---|---|---|---|---|
| | | | | WV1 (matched channel) | | WV2 (mismatched channel) | | Overall AVG |
| | | | | Clean | AVG of noisy condition | Clean | AVG of noisy condition | |
| D | CNN with the same number of layers as those used in E | CNN | DNN | 4.6 | 8.35 | 7.44 | 15.95 | 11.27 |
| E | B with a dropping only for specific frequency bands at the joint layer | CNN | DNN | 4.02 | 6.95 | 6.63 | 15.69 | 10.46 |

AVG=average

TRAINING OF FRONT-END AND BACK-END NEURAL NETWORKS

BACKGROUND

Technical Field

This invention relates generally to a speech recognition system and, more especially, to a training of a front-end neural network and a back-end neural network together. The training of a front-end neural network and back-end neural network together is also referred to as a joint training of front-end and back-end neural networks.

Description of the Related Art

Data-driven approaches using a neural network based on an acoustic front-end, such as a denoising autoencoder, have been investigated to improve robustness of an acoustic model to various noise conditions. Recent works show that a joint training of front-end and back-end neural networks has yielded significant improvement in speech recognition performance.

SUMMARY

According to one aspect of the present invention, an embodiment of the present invention provides a computer-implemented method for training a front-end neural network (hereinafter also referred to as "front-end NN") and a back-end neural network (hereinafter also referred to as "back-end NN"). The method comprises combining the back-end neural network with the front-end neural network to form a joint layer to thereby generate a combined neural network. The method also includes training the combined neural network for a speech recognition with a set of utterances as training data, wherein the joint layer comprises a plurality of frames and each frame comprises a plurality of bins, and wherein one or more specific units in each frame are dropped during the training, each of the specific units being selected randomly or based on a bin number to which the respective unit is set within its frame, the plurality of the specific units corresponding to one or more common frequency bands.

According to another aspect of the present invention, a speech recognition system which performs a speech recognition, using the combined NN which was trained according to the one or more methods described herein, may be provided.

According to another aspect of the present invention, a system, such as a computer system, comprising a computer readable storage medium storing a program of instructions executable by the system to perform one or more methods described herein may be provided.

According to another aspect of the present invention, a computer program product comprising a computer readable storage medium storing a program of instructions executable by the system to perform one or more methods described herein also may be provided.

BRIEF DESCRIPTION OF THE DRAWINGS

The disclosure will provide details in the following description of preferred embodiments with reference to the following figures.

FIG. 2 illustrates an embodiment of a diagram of a front-end NN, a back-end NN and a combined NN which is a combination of the front-end NN and the back-end NN.

FIG. 3 illustrates an example of log Mel-frequency filter bank.

FIGS. 8A and 8B illustrate results of comparative examples and a working example according to an embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "front-end neural network", may refer to a neural network which may be used for a denoising autoencoder including a feature space conversion. The front-end NN may be also referred to as a denoising front-end. The front-end NN may be, for example, but not limited to, a convolutional neural network (CNN) or a deep neural network (DNN). For example, a CNN-based denoising front-end or a DNN-based denoising front-end can be used as a front-end NN, according to an embodiment of the present invention.

The term, "back-end neural network", may refer to a neural network which may be used for an acoustic modeling. Further, the back-end NN is a neural network that can be used for identifying phoneme corresponding to the input speech (that is, input feature). The back-end NN may be also referred to as an acoustic model backend. The back-end NN may be, for example, but not limited to, a convolutional neural network (CNN) or a deep neural network (DNN). For example, a CNN-based acoustic model back-end or a DNN-based acoustic model back-end can be used as a back-end NN, according to an embodiment of the present invention.

The term, "combined neural network", may refer to a neural network which has a function of both the front-end and the back-end NNs.

Figure 1:
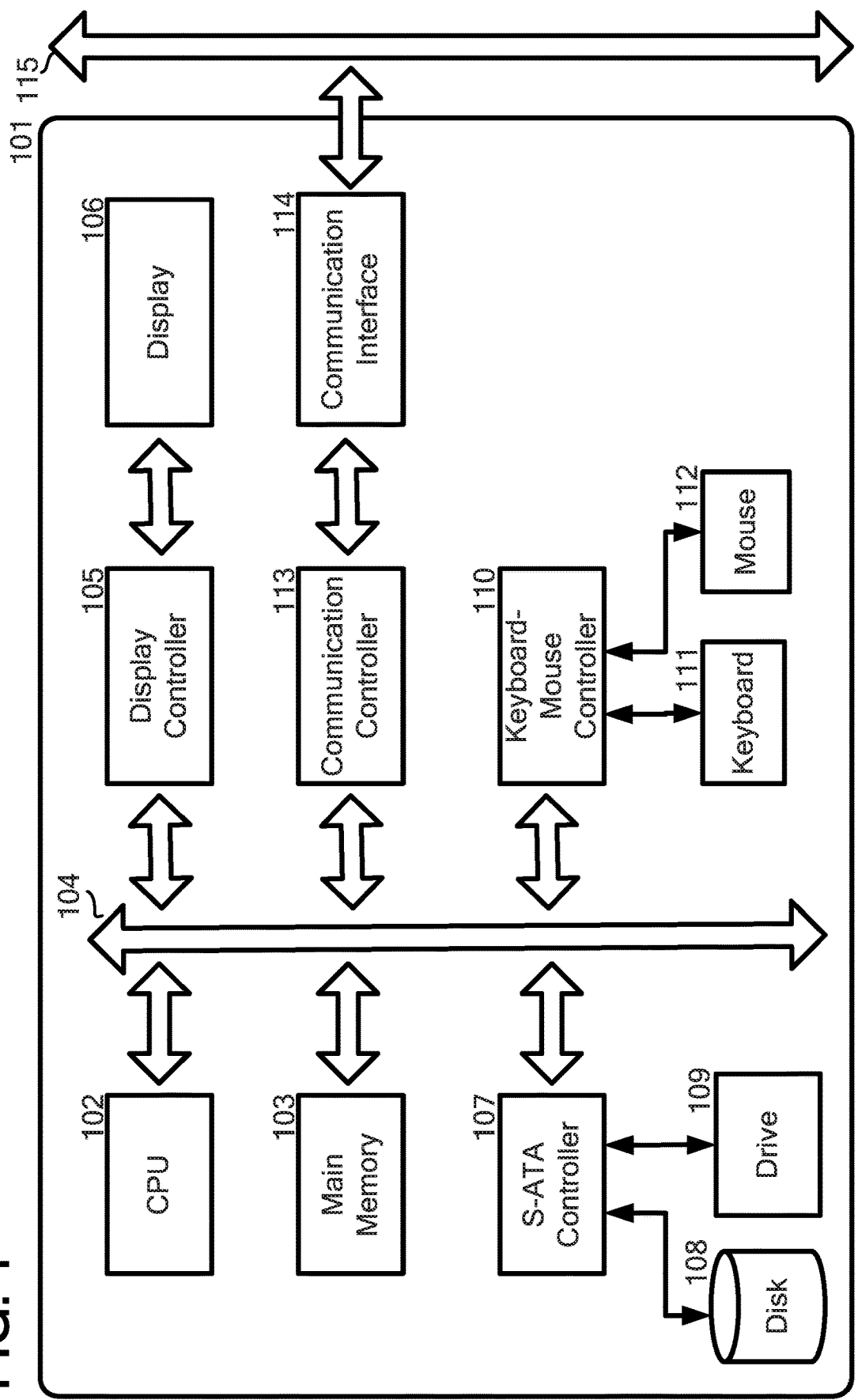
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Prior to explanation of an embodiment of the present invention, each embodiment of "a front-end NN"; "a back-end NN"; and "a combined NN" which may be used in an embodiment of the present invention will be first explained below, by referring to FIG. 2.

With reference now to FIG. 2, FIG. 2 illustrates an embodiment of a diagram of the front-end NN (201), the back-end NN (202) and the combined NN (203).

The Front-End NN (201)

The front-end NN (201) may comprise an input layer (211), one or more hidden layers (212) and an output layer (213). The input layer (211) may represent a feature space which is common with that of the output layer (213).

In one embodiment, the front-end NN (201) is configured to estimate clean frequency filter bank features from noisy input features (291). The noisy input features (291) may be noisy log-power spectral input features. The noisy input features (291) may be inputted to an input layer of the front-end NN (201). The clean frequency filter bank features (292) may be clean log Mel-frequency filter bank features. The clean frequency filter bank features may be used as a target data of the front-end NN (201). The noisy input features (291) may have a higher-dimensional feature space than a feature space being had by the clean frequency filter bank features.

In another embodiment, the front-end NN (201) is configured to estimate clean frequency filter bank features from noisy frequency filter bank input features (291) in the same feature space. The noisy input features (291) may be noisy log Mel-frequency filter bank features. The clean frequency filter bank features (292) may be clean log Mel-frequency filter bank features. The clean frequency filter bank features may be used as a target data of the front-end NN (201).

As explained in the one embodiment mentioned above, a combination of the noisy log-power spectral input features and the clean log Mel-frequency filter bank features can be used as the noisy input features (291) and the clean frequency filter bank features (292), respectively. Alternatively, as explained in the another embodiment mentioned above, a combination of the noisy log Mel-frequency filter bank features and the clean log Mel-frequency filter bank features can be used as the noisy input features (291) and the clean frequency filter bank features (292), respectively.

The output layer (213) of the front-end NN (201) is composed of a plurality of units and corresponds to a plurality of frames before and after a center frame including the center frame. Each unit in the output layer (213) is represented by a circle described in FIG. 2.

The input layer (211) of the front-end NN (201) and the output layer (213) of the front-end NN (201) may have the same feature space. The difference between the input layer (211) and the output layer (213) is that the input data of the input layer (211) may be noisy data and the output data of output layer (213) may be clean data.

In a case where a Mel-Filter bank has N filter channel, the front-end NN (201) has units corresponding to each frame and each unit corresponds to each of the corresponding number of filter channels, respectively. An example of such Mel-Filter bank will be shown in FIG. 3.

In the front-end NN (201), each of the up-pointing arrows between the layers, such as input layer (211) and the hidden layer (212); and the hidden layer (212) and the output layer (213), shows a forward propagation, and each of the down-pointing arrows between the layers mentioned above shows a back propagation. The training in the front-end NN (201) can be carried out using the back propagations between layers.

With reference now to FIG. 3, FIG. 3 illustrates an example of log Mel-frequency filter bank.

FIG. 3 illustrates 24 filter channels (301). As stated above, in a case where a Mel-Filter bank has 24 filter channels (301), the front-end NN (201) has units, namely 24 units, corresponding to each frame and each unit corresponds to each of the 24 filter channels, respectively.

With reference now back to FIG. 2, in order to reconstruct clean frequency filter bank features $x_n$ from noisy input features $\hat{x}_n$, the front-end NN (201) is trained on parallel noisy and clean corpora to minimize the mean squared error loss function $\|y_n - x_n\|$ between the cleaned up features $y_n$ and the actual clean features. The mapping layer (i.e., an encoding layer) of the front-end NN (201) may have the following form:

$$z_i = f(\Sigma_{j=1 \; to \; n} W_{i,j} z_j + b_i)$$

where $z_j$ in the non linear function, $f(\;)$, is an output of j-th hidden units in the previous layer, that is an input to the i-th hidden unit. $W_{i,j}$ is a weight matrix between j-th units in the previous layer and i-th unit in the current layer. $b_i$ is a bias for the i-th unit in the current layer. The non linear function, $f(\;)$, is a nonlinearity such as a sigmoid, tan h, or ReLU. A regularization term is often included in the loss function to prevent over-fitting. The noisy input features $\hat{x}_n$ and the clean frequency filter bank features $x_n$ as acoustic features may also include neighboring left and right frames as the acoustic context. After the front-end NN (201) has been trained as a denoising front-end, the cleaned up features processed by the front-end NN (201) can be used as an input (221) of the back-end NN (202) in a case where the front-end NN (201) and the back-end NN (202) are separately used.

The Back-End NN (202)

The back-end NN (202) may comprise an input layer (221), one or more hidden layers (222) and an output layer (223). The input layer (221) may represent a feature space which is different with that of the output layer (223).

The output from the front-end NN (201) is inputted to the input layer (221) of the back-end NN (202).

The output layer (223) of the back-end NN is composed of a plurality of units. Each of the units corresponds to context dependent phoneme. The output layer (223) of the back-end NN (202) outputs posterior probability in each context-dependent phoneme.

In the back-end NN (202), each of the up-pointing arrows between the layers, such as input layer (221) and the hidden layer (222); and the hidden layer (222) and the output layer (223), shows a forward propagation, and each of the down-pointing arrows between the layers mentioned above shows a back propagation. The training in the front-end NN (201) can be carried out using the back propagations between layers.

The Combined NN (203)

The combined NN (203) is a neural network made of the front-end NN (201) and the back-end NN (202). The combined NN (203) is generated by combining the back-end NN (202) with the front-end NN (201) so that an output layer (213) of the front-end NN (201) is also an input layer (221) of the back-end NN (202) to form a joint layer (233).

The combined NN (203) may comprise an input layer (231) corresponding to the input layer (211) of the front-end NN (201), one or more hidden layers (232) derived from the front-end NN (201), a joint layer (233), one or more hidden layers (234) derived from the back-end NN (202), and an output layer (235) corresponding to the output layer (223) of the back-end NN (202).

In the combined NN (203), the output layer of the front-end NN is treated as the input layer of the back-end NN and integrated as a hidden layer (233) in the combined NN (203).

In the combined NN (203), each of the up-pointing arrows between the layers, such as the input layer (231) and the hidden layer (232); the hidden layer (232) and the joint layer (233); the joint layer (233) and the hidden layer (234); and the hidden layer (234) and the output layer (235), shows a forward propagation, and each of the down-pointing arrows between the layers mentioned above shows a back propagation. The training in the combined NN (203) can be carried out using the back propagations between layers.

In a part of the combined NN (203) which corresponds to the front-end NN, a feature-space conversion may be carried out together with the denoising.

Hereinafter, an embodiment of the present invention will be described with reference to the following FIGS. 4A and 4B, FIGS. 5 to 7, and FIGS. 8A and 8B.

The joint training of front-end and back-end NNs has yielded significant improvement in speech recognition performance, as described in the following Non-patent literature: T. Gao et. al., "Joint training of front-end and back-end deep neural networks for robust speech recognition," IEEE Acoustics, Speech and Signal Processing (ICASSP), pp. 4375-4379, 2015. There is still need to improve robustness of an acoustic model to various noise conditions.

The idea of an embodiment of the present invention is on the basis of the above mentioned joint training of front-end and back-end NNs.

Figure 4A:
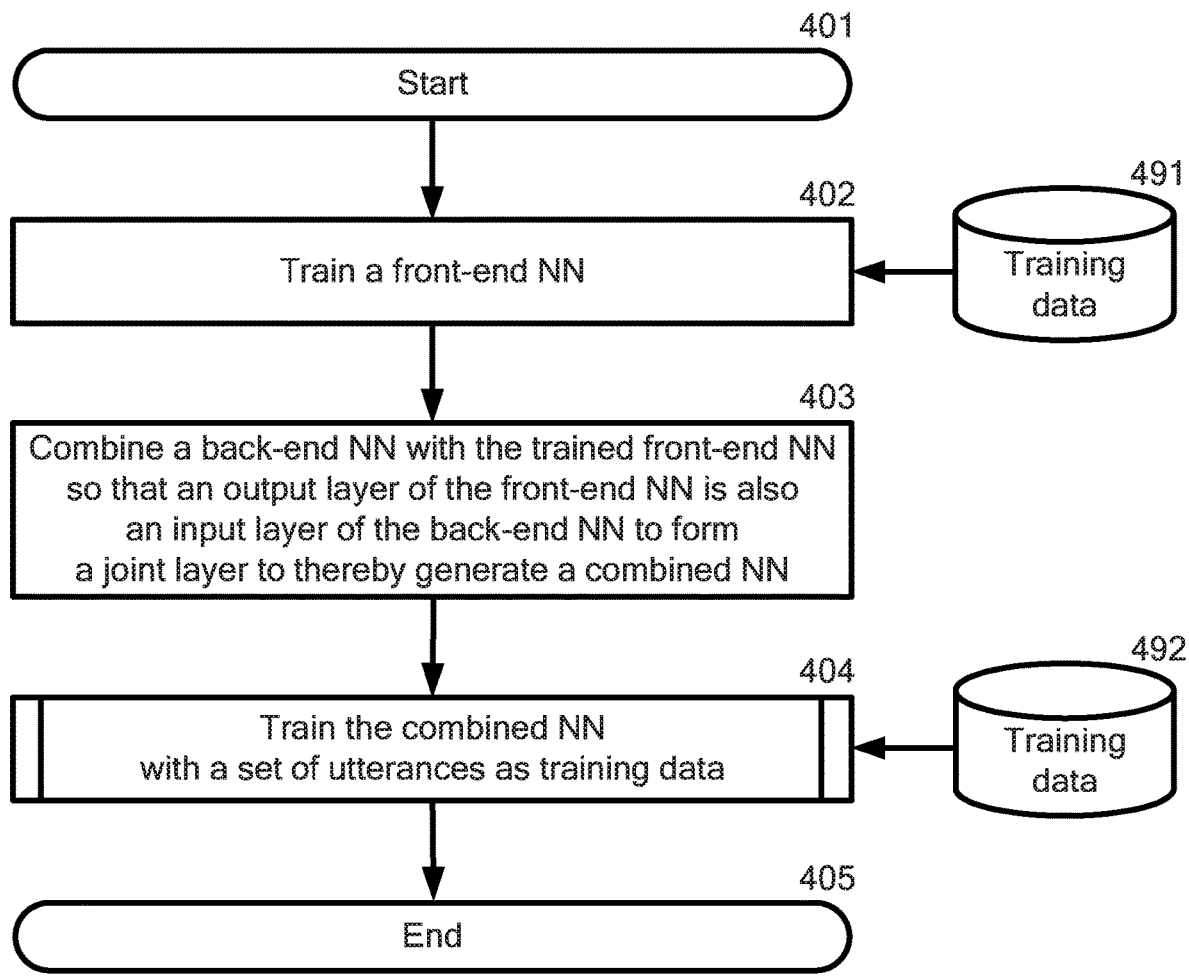
FIGS. 4A and 4B illustrate an embodiment of a flowchart of a process for training a front-end NN and a back-end NN together for a speech recognition.
Figure 4B:
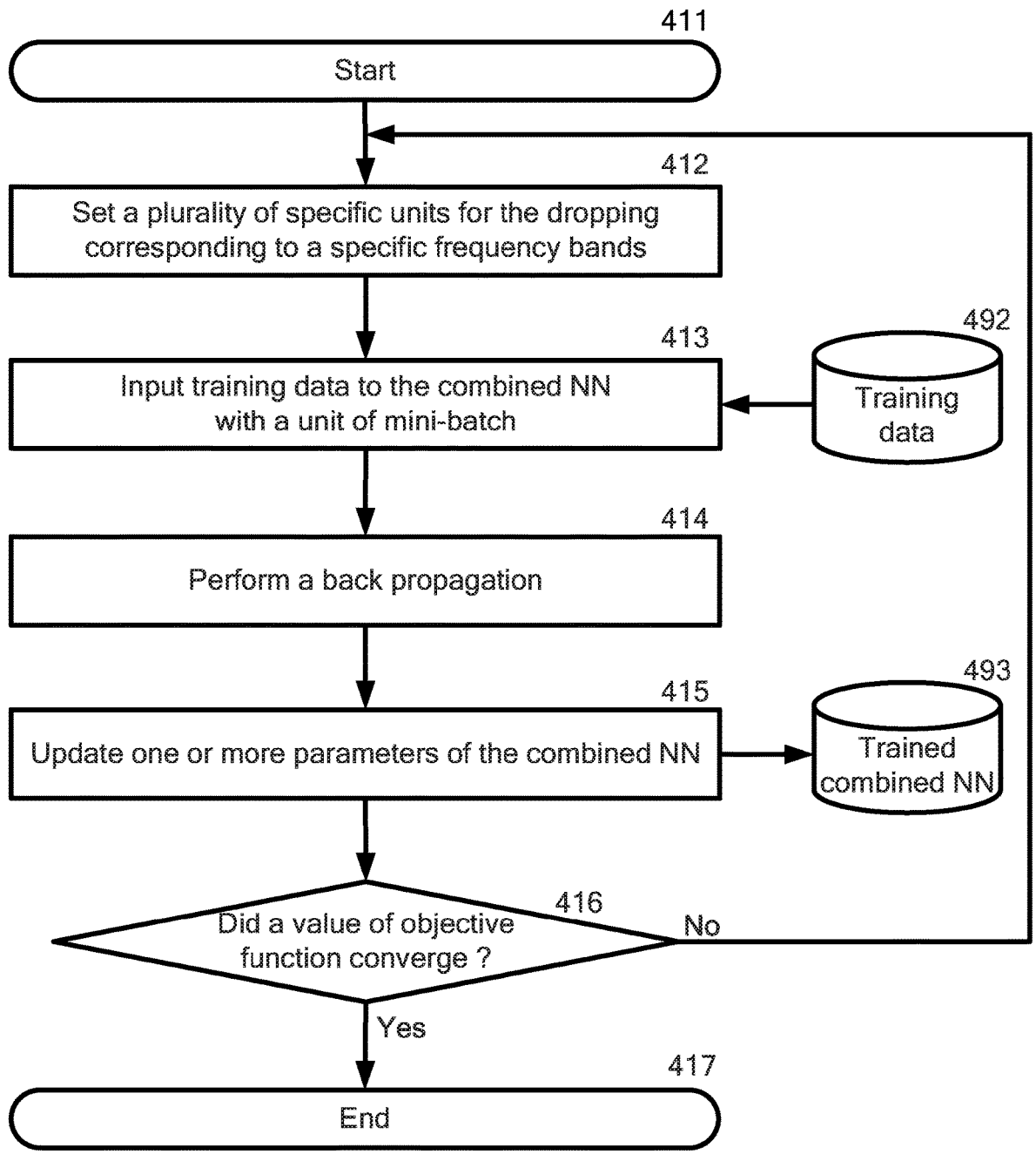

FIGS. 4A and 4B illustrate an embodiment of a flowchart of a process for training a front-end NN and a back-end NN together for a speech recognition.

Figure 7:
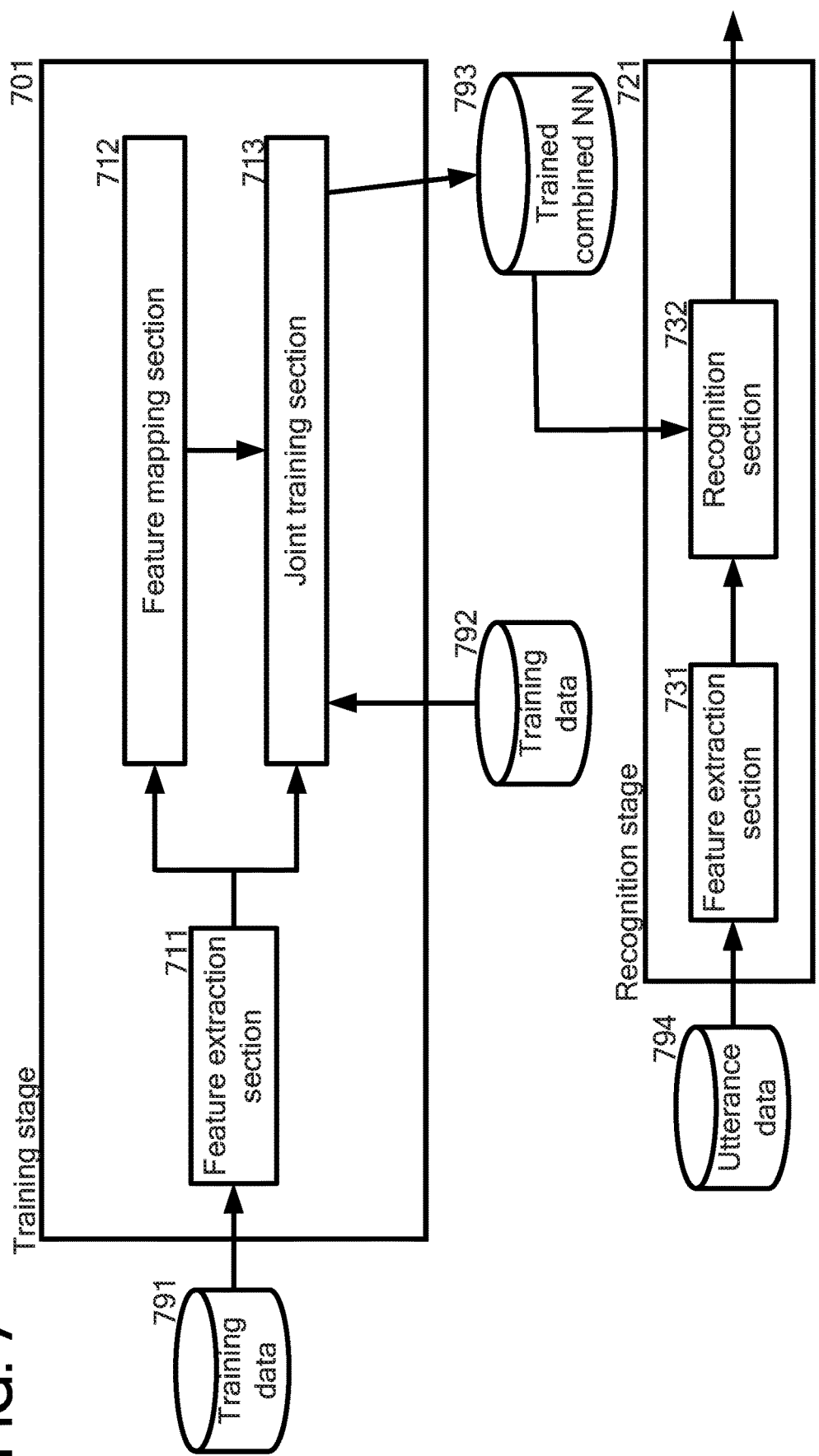
FIG. 7 illustrates an embodiment of an overall diagram of a system used for performing a training stage and a system used for performing a recognition stage.

A system, such as the computer (101) described in FIG. 1, performs the process described in FIGS. 4A and 4B. This process is carried out in a training stage of neural networks, for example, as seen in FIG. 7 mentioned below.

With reference now to FIG. 4A, FIG. 4A illustrates a main flowchart of the process mentioned above.

In step 401, the system starts the process mentioned above.

In step 402, the system reads a computer program for executing a front-end NN from a storage (not shown) which can be accessible by the system. The front-end NN may, for example, but not limited to CNN-based denoising front-end or a DNN-based denoising front-end, which are mentioned above.

The system then trains the front-end NN, using a set of utterances as the train data (491) in order to learn denoising feature-space transforms with multi-condition style trainings. The training is done by any method known in the art. The system obtains the trained front-end NN after the training.

The reasons for training the front-end NN before combining the back-end NN with the front-end NN (see step 403) are as follows. It is important to make a role of the layers (231 and 232) which is located before the joint layer (233) clearer, by performing the training mentioned above.

In a case where the CNN is used as a part of the combined NN which corresponds to the front-end NN, the part not only has convolutional layers but also fully connected layers that are typical to the back-end NN. To allow for seamless integration with the back-end NN, the predicted targets of the front-end NN have sufficient context. However, multiple frames as the target of the front-end NN are used, it is observed that the output features often have strong correlation between frames as the targets of the front-end NN. In order to circumvent this issue, the training is done for the front-end NN with a single frame target before expanding the target to multiple frames, such as N-frames where N≥2.

In a case where the DNN is user as a part of the combined NN which corresponds to the front-end NN, the training is also done for the front-end NN with a single frame target before expanding the target to multiple frames, such as N-frames where N≥2.

In step 403, the system reads a computer program for executing a back-end NN from the storage (not shown). The back-end NN may or may not be trained, using a set of utterances as the train data (491) before generating the combined NN. This is because a difference between the back-end NN with training and the back-end NN without training may not be so large.

The system then combines the back-end NN with the trained front-end NN so that an output layer of the front-end NN is also an input layer of the back-end NN to form a joint layer to thereby generate a combined NN.

An example of a diagram for combining the back-end NN with the front-end NN can be seen in FIG. 2 mentioned above.

In step 404, the system trains the combined NN with a set of utterances as training data (492). This training means that the joint training of front-end and back-end NNs is performed.

During the training, a plurality of specific units in the joint layer are dropped. The dropping for the joint layer may be a process for ignoring or removing one or more specific units corresponding to each frame, along with all its incoming and outgoing connections. The dropping may be referred also to as "dropout".

The plurality of the specific units correspond to one or more common frequency bands. For the dropping, one or more common specific units in each frame are dropped as the plurality of the specific units in the joint layer.

During the training, the dropping of a plurality of the specific units in the joint layer may be performed in an early stage of the training and then a random dropping of a plurality of random units may be performed in a later stage. The early stage may be, for example, first N-th iterations, where N denotes a positive integer greater than one.

The further details of step 404 will be explained below by referring to FIG. 4B mentioned below. Further, an example of the dropping of the plurality of the specific units in the joint layer will be explained below by referring to FIG. 5 mentioned below.

In step 405, the system terminates the process mentioned above.

With reference now to FIG. 4B, FIG. 4B illustrates a detailed flowchart of step 404 described in FIG. 4A.

In step 411, the system starts the process of step 404.

In step 412, the system sets a plurality of specific units for the dropping. Each of the specific units corresponds to a specific frequency band. As stated above, one or more common specific units in each frame are dropped as the plurality of the specific units in the joint layer.

For example, one or more units which have common bin number in each frame are dropped.

One or more common specific units for the dropping in each frame may be randomly determined.

Further, the number of specific units for the dropping in each frame may be experimentally or empirically determined.

An example of such dropping will be explained below by referring to FIG. 5.

In step 413, the system inputs training data (492) to the combined NN with a unit of mini-batch. The training data (492) may be the same with or different from the train data (491).

In step 414, the system performs a back propagation on the combined NN. Any algorithm for the back propagation known in the art can be used. The objective function may be optimized using the back propagation with a stochastic gradient descent method in mini-batch mode of N sample frames.

In step 415, the system updates one or more parameters of the combined NN to obtain the trained combined NN (493). The parameter may be a weight parameter, $W_i$, and bias parameter, $b_i$, between layers.

In step 416, the system judges whether a value of the objective function converges or not. If the judgment is positive, the system proceeds to step a final step 417. Meanwhile, if the judgment is negative, the system proceeds back to step 412. After back to step 412, steps 412 to 416 are repeated until the judgment is positive in step 416. In a case where step 412 is repeatedly performed, the setting of a plurality of specific units for the dropping can be changed. Accordingly, the specific units for the dropping can be changed in each repeat step. The training of the combined NN (493) can be performed by repeating steps 412 to 416.

In step 417, the system terminates the process of step 404 and then proceeds to the final step 405 described in FIG. 4A.

Figure 5:
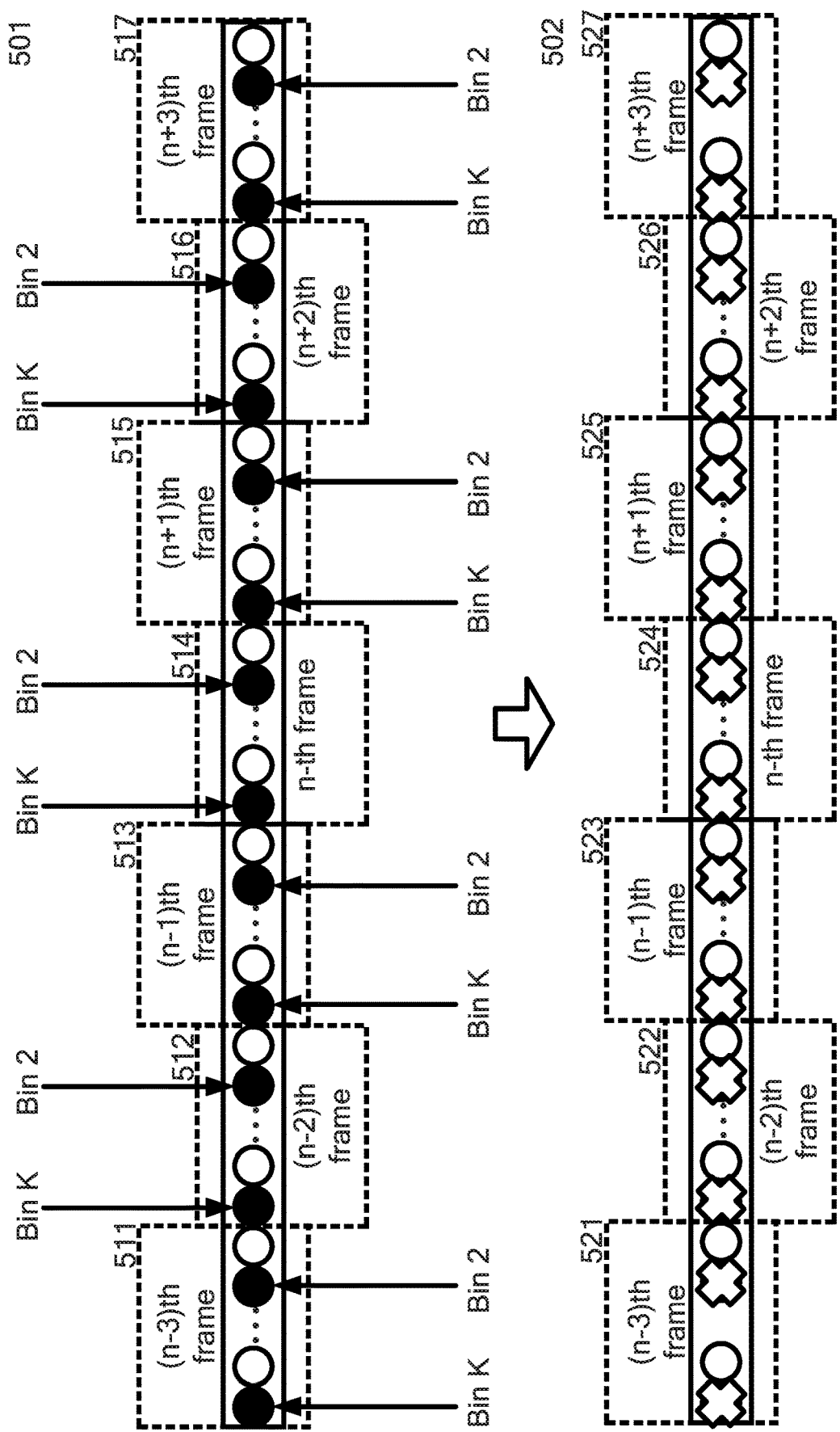
FIG. 5 illustrates an embodiment of a diagram for dropping a plurality of specific units in a joint layer in the combined NN.

With reference now to FIG. 5, FIG. 5 illustrates an embodiment of a diagram for dropping a plurality of specific units in the joint layer in the combined NN (203).

The diagram (501) illustrates a part of series of frames: i.e., (n−3)th frame (511), (n−2)th frame (512), (n−1)th frame (513), n-th frame (514), (n+1)th frame (515), (n+2)th frame (516) and (n+3)th frame (517). Each frame is surrounded by a rectangle shape with a dotted line.

Further, the diagram (501) illustrates that each frame (511, 512, 513, 514, 515, 516 and 517) has 24 units, each of which corresponds to each of the 24 filter channels of the Mel-Filter bank, respectively. Each unit is shown a circle in FIG. 5.

The system can set a plurality of specific units in a joint layer comprised in the combined NN (203) for the dropping. Each of the specific units corresponds to a specific frequency band.

In FIG. 5, the Bins K and 2 in each frame (511, 512, 513, 514, 515, 516 and 517) are set to the specific units for the dropping.

During the training, the plurality of specific units are dropped in the joint layer.

The diagram (502) shows that the Bins K and 2 were dropped from each frame (511, 512, 513, 514, 515, 516 and 517). In the diagram (512), each unit which was dropped is marked with an X mark (see 502). Accordingly, each frame (521, 522, 523, 524, 525, 526 and 527) has 22 units which can be used in the combined NN (203).

In one embodiment, the dropping of the plurality of specific units can be performed in whole stage of the training of the combined NN (203). In another embodiment, the dropping of the plurality of specific units can be performed in an early stage of the training of the combined NN (203), as seen in FIG. 5, and then the random dropping of a plurality of random units can be performed in a later stage.

Figure 6:
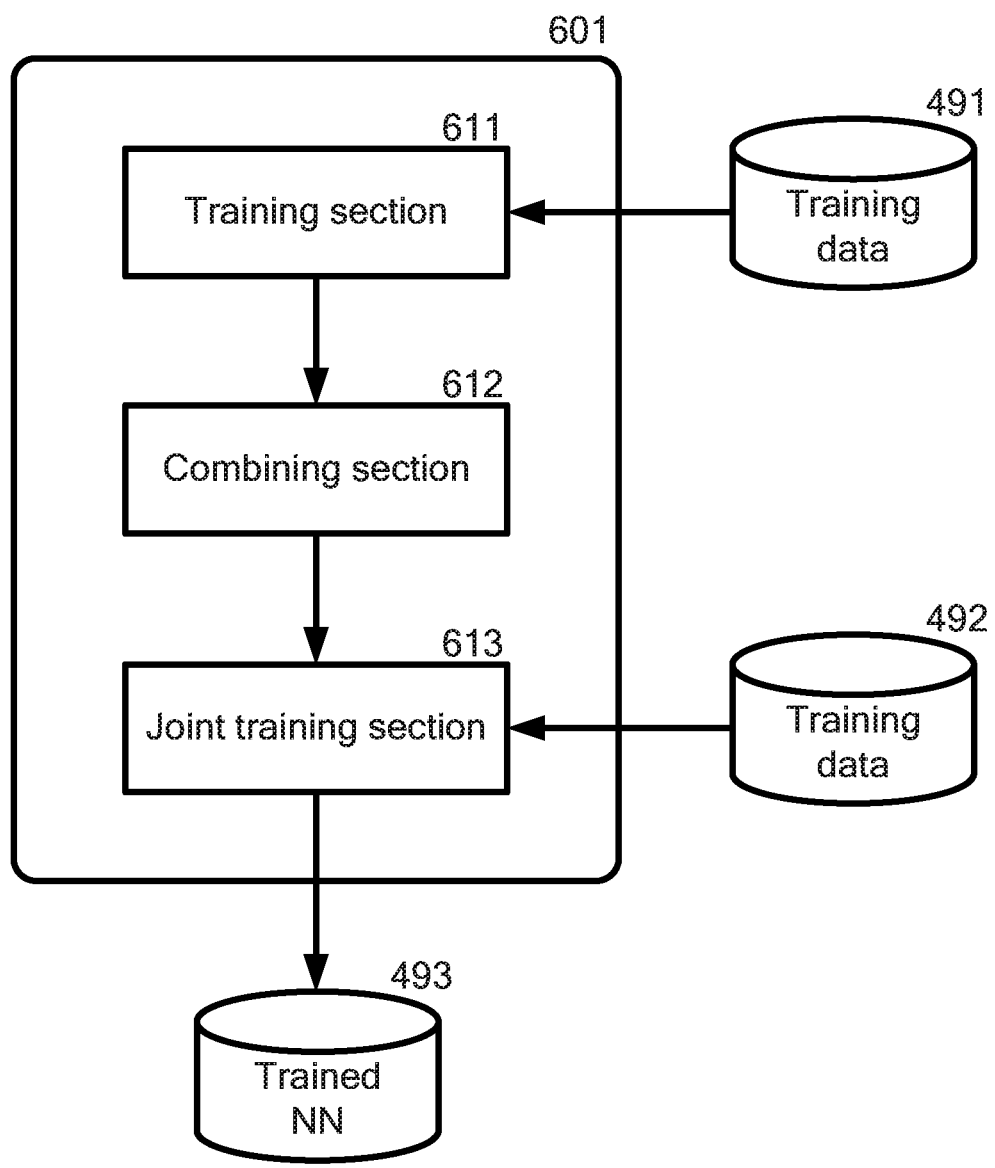
FIG. 6 illustrates an embodiment of an overall functional block diagram of a system used in accordance with the embodiment of the flowchart described in FIGS. 4A and 4B.

With reference now to FIG. 6, FIG. 6 illustrates an embodiment of an overall functional block diagram of a system used in accordance with the embodiment of the flowchart described in FIGS. 4A and 4B.

The system (601) may correspond to the computer (101) described in FIG. 1.

The system (601) may comprise a training section (611), a combining section (612) and a joint training section (613).

The training section (611) reads a computer program for executing a front-end NN from a storage and then trains the front-end NN, using the train data (491) to obtain the trained front-end NN.

The training section (611) may perform step 402 described in FIG. 4A.

The combining section (612) reads a computer program for executing the trained front-end NN and a back-end NN from the storage and then combines the back-end NN with the trained front-end NN so that an output layer of the front-end NN is also an input layer of the back-end NN to form a joint layer to thereby generate a combined NN.

The combining section (612) may perform step 403 described in FIG. 4A.

The joint training section (613) trains the combined NN (203) with a set of utterances as training data (492).

The joint training section (613) may perform step 404 described in FIG. 4A and steps 412 to 416 described in FIG. 4B.

With reference now to FIG. 7, FIG. 7 illustrates an embodiment of an overall diagram for a system used for performing a training stage and a system used for performing a recognition stage, in which an embodiment of the present invention can be used.

A system (701) may be used for performing a training stage. A system (721) may be used for performing a recognition stage.

The system (701) may be the same with or different from the system (721).

The system (701) may comprise a feature extraction section (711), a feature mapping section (712) and a joint training section (713).

The system (721) may comprise a feature extraction section (731) and a recognition section (732).

In the training stage, the feature extraction section (711) extracts, from the training data (791), acoustic features, namely, for example, but not limited to, LMF-B, MFCC or LPC (with dynamic feature) followed by cepstral mean normalization (CMN). These features are further processed by the feature mapping section (712), such as a DNN-based feature mapping with a denoising effect. In the feature mapping section (712), a DNN model for the feature mapping is trained using original noisy features with clean training labels. This DNN model can be regarded as a pre-trained NN for the combined NN. The model can be further optimized by the joint training section (713) in which the combined NN (203) is used and then the trained combined NN (793) is obtained by training the combined NN (203) using the training data (792). In the joint training section (713), the combined NN is trained to estimate posterior probabilities of context dependent phonemes corresponding to input noisy features.

In the recognition stage, a feature extraction section (731) extracts acoustic features from the utterance (794). A recognition section (732) then performs a recognition process, using the trained combined NN (793).

FIGS. 8A and 8B illustrate results of comparative examples and a working example according to an embodiment of the present invention.

The experiment was performed using Aurora-4 noisy speech recognition task.

Noisy speech data were used as training data and testing data.

Aurora-4 has two data sets: namely, WV1 and WV2.

WV1: The matched channel condition, i.e., the same microphone, was used between a training stage and a testing stage.

WV2: The mismatched channel condition, i.e., different microphones, was used between a training stage and a testing stage.

Both of WV1 and WV2 have various additive noises.

The combined NN was generated from combining a back-end DNN-AM with a CNN-front-end NN, i.e., CNN-denoising feature-space transforms so that an output layer of the CNN-based front-end NN is also an input layer of the back-end DNN-AM to form a joint layer as a hidden layer. The combined NN has two convolutional layers followed by nine fully connected layers.

The CNN-front-end NN: 256-48-96-1024×2L-40×11 (256-dimensional log spectral features provided as an input; the front-end NN has two convolutional layers with 48 and 96 filters respectively; fully connected 2 hidden layers with 1024 units in each layer after the convolutional layers; and 40 dimensional outputs with 11 frame contexts)

The back-end DNN-AM: 40×11-1024×6L-2000 (40 dimensional inputs with 11 frame contexts; fully connected 6 hidden layers with 1024 units in each layer; and 2000 context dependent phonemes provided as an output)

With reference now to FIG. 8A, FIG. 8A illustrates a result of the comparative examples A to C and the working example E.

The result is shown by performance, i.e., WER (word error rate) %.

The comparative example A is the baseline system. The comparative example A used CNN-AM trained with ReLU non-linearity and standard dropping for the last two hidden layers. The baseline system has CNN-AM having two convolutional layers followed by five fully connected layers. The base system has no denoiser The comparative example B was done using the combined NN without a dropping.

The comparative example C was done using the combined NN with a random dropping. The random dropping was performed by dropping, at every frame, random frequency bands from the output of the front-end NN.

The working example E was done using the combined NN with a dropping of a plurality of specific units in the joint layer of the combined NN. The dropping of a plurality of specific units was performed by dropping, for every frame, only a particular frequency bands for each mini-batch.

As seen in Table (801), the working example E shows the best score, compared to the comparative examples A to C.

Further, the working example E shows that the joint training not only improves the performance but also outperforms, compared to the comparative example A.

With reference now to FIG. 8B, FIG. 8B illustrates a result of the comparative example D and the working example E.

The comparative example E was done using a standard CNN having two convolutional layers followed by nine fully connected layers. The number of convolutional layers and the fully connected layers for the CNN used in the comparative example E are the same with those for the combined NN used in the working example E.

A seen in Table (802), the working example E shows a better score, compared to the comparative example E.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for training a front-end neural network and a back-end neural network, the method comprising:
    combining the back-end neural network with the front-end neural network to form a joint layer to thereby generate a combined neural network; and
    training the combined neural network for a speech recognition with a set of utterances as training data, wherein the joint layer comprises a plurality of frames and each frame comprises a plurality of bins, and wherein one or more specific units in each frame are dropped during the training, each of the specific units being selected randomly or based on a bin number to which the respective unit is set within its frame, the plurality of the specific units corresponding to one or more common frequency bands.

2. The method according to claim 1, wherein the front-end neural network is configured to estimate clean frequency filter bank features from noisy input features, the noisy input features having a higher-dimensional feature space than a feature space being had by the clean frequency filter bank features.

3. The method according to claim 2, wherein the clean frequency filter bank features are log Mel-frequency filter bank features.

4. The method according to claim 2, wherein the noisy input features are log-power spectral input features.

5. The method according to claim 1, wherein the front-end neural network is configured to estimate clean frequency filter bank features from noisy frequency filter bank input features, wherein the noisy frequency filter bank input features and the clean frequency filter bank features are in the same feature space.

6. The method according to claim 5, wherein the noisy frequency filter bank input features, the clean frequency filter bank features, or a combination of these are log Mel-frequency filter bank features.

7. The method according to claim 1, wherein the output layer of the front-end neural network is composed of a plurality of units and corresponds to a plurality of frames before and after a center frame.

8. The method according to claim 1, wherein combining the back-end neural network with the front-end neural network further comprises integrating the output layer of the front-end neural network as a hidden layer in the combined neural network.

9. The method according to claim 1, wherein the method further comprises:
    setting a plurality of specific units for the dropping, each of the specific units corresponding to a specific frequency band.

10. The method according to claim 1, the method further comprising:
    training the front-end neural network,
    wherein the trained front-end neural network is used in the combining.

11. A speech recognition system which performs a speech recognition using the combined neural network which was trained according to the method described in claim 1.

12. A system, comprising:
    a processor; and
    a memory storing a program, which, when executed on the processor, performs an operation for training a front-end neural network and a back-end neural network, the operation comprising:
        combining the back-end neural network for a speech recognition with the front-end neural network to form a joint layer to thereby generate a combined neural network; and
        training the combined neural network for a speech recognition with a set of utterances as training data, wherein the joint layer comprises a plurality of frames and each frame comprises a plurality of bins, and wherein one or more specific units in each frame are dropped during the training, each of the specific units being selected randomly or based on a bin number to which the respective unit is set within its frame, the plurality of the specific units corresponding to one or more common frequency bands.

13. A computer program product for training a front-end neural network and a back-end neural network, the computer program product comprising a computer usable storage medium having program instructions embodied therewith, wherein the computer readable storage medium is not a transitory signal per se, the program instructions executable by a computer to cause the computer to perform a method comprising:
    combining the back-end neural network with the front-end neural network to form a joint layer to thereby generate a combined neural network; and
    training the combined neural network for a speech recognition with a set of utterances as training data, wherein the joint layer comprises a plurality of frames and each frame comprises a plurality of bins, and wherein one or more specific units in each frame are dropped during the training, each of the specific units being selected randomly or based on a bin number to which the respective unit is set within its frame, the plurality of the specific units corresponding to one or more common frequency bands.

14. The computer program product according to claim 13, wherein the front-end neural network is configured to estimate clean frequency filter bank features from noisy input features, the noisy input features having a higher-dimensional feature space than a feature space being had by the clean frequency filter bank features.

15. The computer program product according to claim 14, wherein the clean frequency filter bank features are log Mel-frequency filter bank features.

16. The computer program product according to claim 13, wherein the front-end neural network is configured to estimate clean frequency filter bank features from noisy frequency filter bank input features, wherein the noisy frequency filter bank input features and the clean frequency filter bank features are in the same feature space.

17. The computer program product according to claim 16, wherein the noisy input features are log-power spectral input features.

18. The computer program product according to claim 13, wherein the output layer of the front-end neural network is composed of a plurality of units and corresponds to a plurality of frames before and after a center frame.

19. The computer program product according to claim 13, wherein combining the back-end neural network with the front-end neural network further comprises integrating the output layer of the front-end neural network as a hidden layer in the combined neural network.

20. The computer program product according to claim 13, wherein the method further comprises:
    setting a plurality of specific units for the dropping, each of the specific units corresponding to a specific frequency band.

* * * * *